United States Patent [19]
Walker

[11] 3,718,000
[45] Feb. 27, 1973

[54] DUAL FUELED ENGINE WITH TEMPERATURE SWITCHOVER

[76] Inventor: Brooks Walker, 1280 Columbus Avenue, San Francisco, Calif. 94133

[22] Filed: June 1, 1971

[21] Appl. No.: 148,545

Related U.S. Application Data

[63] Continuation-in-part of Ser. No. 17,167, March 6, 1970, abandoned.

[52] U.S. Cl. .................................... 60/285, 123/121
[51] Int. Cl. ............................................. F02b 75/10
[58] Field of Search .123/27 GE, 120, 121, 127, 136; 60/285, 284

[56] References Cited

UNITED STATES PATENTS

| | | |
|---|---|---|
| 2,004,403 | 6/1935 | Davisson ............................. 123/121 |
| 2,315,882 | 4/1943 | Trimble ............................... 123/121 |
| 2,339,988 | 1/1944 | Gerson ................................ 123/121 |
| 2,381,304 | 8/1945 | Merrill ................................ 123/121 |
| 2,675,793 | 4/1954 | Ziege .................................. 123/121 |
| 3,366,194 | 1/1968 | Walker ................................ 123/127 |
| 3,540,419 | 11/1970 | Fox ................................. 123/27 GE |

Primary Examiner—Douglas Hart
Attorney—Brooks Walker

[57] ABSTRACT

A duel fueled motor using a liquid fuel such as gasoline and a gaseous fuel such as LPG or pressurized natural gas with one or two exhaust treating devices in the exhaust system that operate efficiently when above a selected temperature in treating exhaust from gasoline powered operation, a thermally sensitive controlled changeover from gas to gasoline when the treater reaches a desired temperature and switches back to gas fuel when below a desired temperature.

4 Claims, 3 Drawing Figures

PATENTED FEB 27 1973 3,718,000
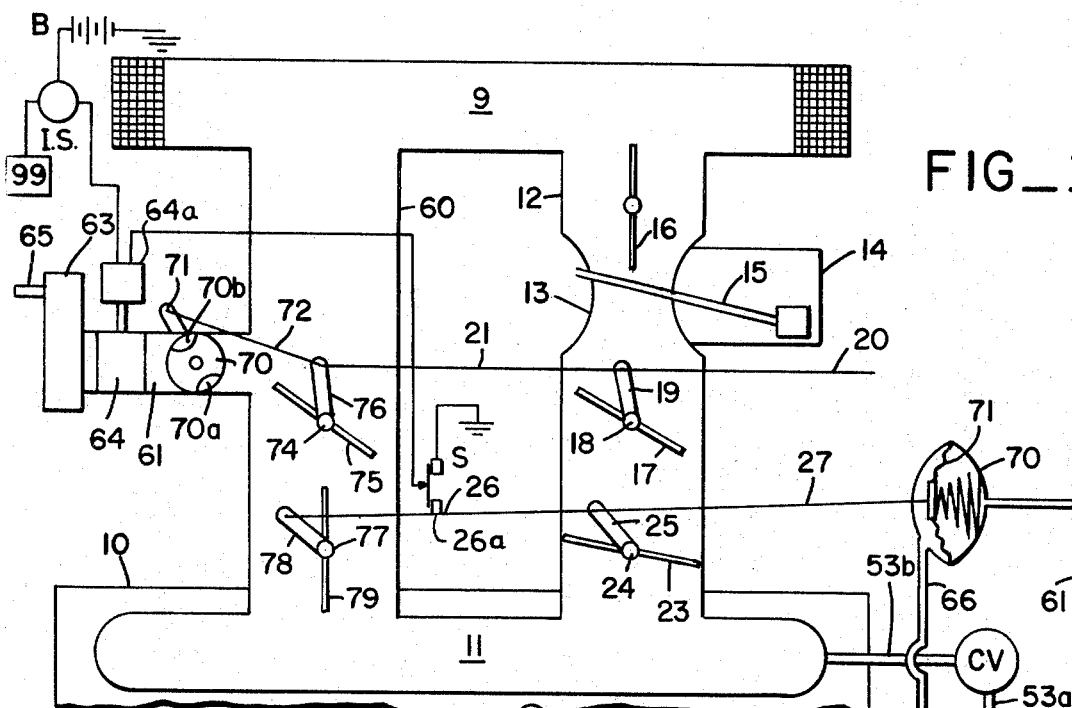
FIG_1
FIG_2
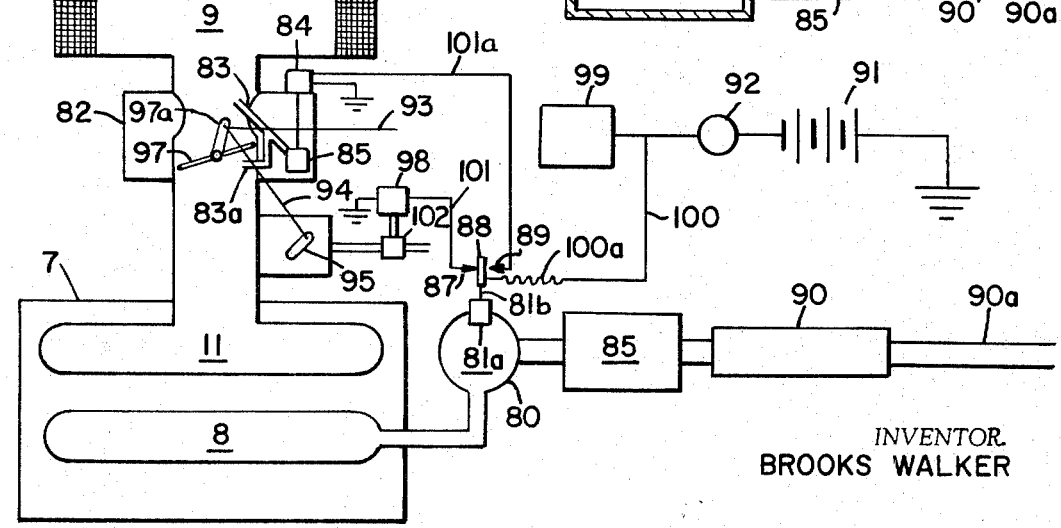
FIG_3
INVENTOR.
BROOKS WALKER 3,718,000

DUAL FUELED ENGINE WITH TEMPERATURE SWITCHOVER

This case is a Continuation-in-part of Ser. No. 17,167, filed Mar. 6, 1970 and now abandoned, for DUAL CARBURETORS FOR DUAL FUELS, insofar as the material common to both is concerned.

One object of the invention is as stated in the abstract as the exhaust of a cold engine or an engine while warming up to desired temperature has less emissions when operating on gas than when operating on gasoline. If the warm up of the catalyst exhaust treater is on gas while the engine is warmed up and when warm enough the engine is automatically switched to gasoline operation, the exhaust emissions will then be within the present legally prescribed limits with the catalyst treater operating at or above the desired temperature.

Another object is to have such automatic switchover powered by suction from the intake of said engine with a storage reservoir for suction to provide suction when operating at or near wide open throttle. Also, a spring in the switchover will result in all starts being on gas when starting cold even with insufficient suction to operate the switchover mechanism during cranking if no spring were used, the reservoir holding suction when operating on gasoline after warm up for a limited time.

Another object is to conserve the gas supply and only use it while warming up for the first few minutes until the converter can operate efficiently.

Another object is to provide an electrically powered switchover in order to have a suitable changeover before sufficient engine suction is developed for the switch to gas operation when starting cold. Suction after standing a long time might be insufficient to switch from gasoline to gas operation for a cold start on gas. Gas makes a better starting fuel with lower exhaust emissions with a cold motor than when operating on gasoline. A snap thermally sensitive electric switch may be simpler than a snap action vacuum valve.

Another object is to provide a switchover means which will work whether two carburetors—one for gas and one for gasoline—are used or whether a combination carburetor with one throttle for operation on gasoline or gas.

Other features will be pointed out in the accompanying specification and claims.

I have illustrated my invention by way of example in the accompanying drawings, in which:

FIG. 1 is a side elevation partly in section and partly schematic showing one form of the invention.

FIG. 2 is a side elevation of the control in another position.

FIG. 3 is a side elevation partly in section and partly schematic showing another form of control for switching from gas to gasoline and vice versa, with a combined gas and gasoline carburetor with suitable shut off controls.

In all forms like numerals of reference refer to corresponding parts.

In FIG. 1 and FIG. 2 I have shown an engine 10 with an intake manifold 11. A choke 16 operates between the air cleaner 9 and venturi 13 which has the proper fuel feeding (not shown) from the fuel in bowl 14. A throttle 17 is mounted on the usual rotatable shaft 18 and controlled by arm 19. A shut off butterfly valve 23 is mounted on rotatable shaft 24 controlled by arm 25 and connected to rod 27 which goes to control motor 70.

Another carburetor 60 operates on gas, such as LPG or pressurized gas, and has a mixing valve 70 with calibrated openings 70a and 70b so that when arm 71 moves in connection with the movement of control arm 76 for throttle 75 through rotatable shaft 74, the correct amount of gas from high pressure pipe 65 will enter area 61 after being reduced in pressure by the usual controls 63 and 64, as described in S.A.E. Report No. 70 000 78 presented at Auto Engineering Congress, Detroit, Mich., Jan. 2-16, 1970, FIG. 1 per copy attached. A shut off solenoid 64a is controlled by switch S which completes the ground to turn on the gas when stop 26a moves to the left to open valve 79 for gas operation. Power to operate comes from battery B through ignition switch 15.

Control rod 21 connects control arm 76 for throttle 75 of gas carburetor 60 to work in unison with throttle 17 of gasoline carburetor 12. Gas carburetor shut off butterfly 79 is mounted on shaft 77 and controlled by arm 78.

Arm 78 is connected to arm 25 by control rod 26 so that when rod 26 is moved to the left, as shown in FIG. 1, gas shut off valve 79 and the valve operated by solenoid 64a will be wide open for operating on gas carburetor 60 and gasoline shut off valve 23 will be tight closed, as shown in FIG. 1, to shut off operation on gasoline and operate on gas carburetor 60 and gas flow to carburetor 60 will be open by the operation of solenoid 64a when switch S forms a ground.

Exhaust manifold 6 is connected to first treatment device 80 and if necessary to a second treater 85 and then muffler 90 to tailpipe 90a.

When the sensor 81 in exhaust treatment device 80 gets up to the desired temperature, the hot wax on other sensing material or mechanisms in 81 will move the joint 42 above the line joining joints 40 and 49. A snap action by spring 48 acting on washers 46a and 47a will result to snap plunger 57 of valve 56 to the lower position as shown in FIG. 2 to allow engine suction from line 53 to pass valve plunger Section 57a to line 61 to the right of diaphragm 71 in suction operated motor 71 to quickly switch control rods 27 and 26 to the right (as viewed in FIG. 1) to close valve 79 and the valve operated by solenoid 64a and open valve 23 to close off gas carburetor 60 operation and operate the engine on gasoline carburetor 12 with efficient treatment of the gasoline exhaust by preheated catalyst in treatment 80 and 85 before going out tailpipe 90a. To assure adequate suction to provide the desired switchover to operation on gasoline when treatment 80 is up to temperature, a reservoir 55 is between hose 53a and 53 with a check valve CV, between reservoir 55 and intake 1 to hold suction in reservoir 55.

When treatment device 80 is below the desired temperature sensing material in sensor 81 will contract and pivot 42 will drop below the line connecting pivots 40 and 49. Spring 46 will snap joint 49 up and snap valve 57 to the upper position, as shown in FIG. 1, so the engine will operate on gas carburetor 60 until switched to gasoline operated on carburetor 12 as described previously. Valve 56 provides a bleed 56a for line 66 in the position shown in FIG. 2 and bleed 56b (Space around stem 57c) for line 61 when in the position shown in FIG. 1.

In FIG. 3 we have a motor 7 with intake manifold 11. Exhaust manifold 8 leads to first treatment 80, then to second treatment 85, muffler 90, and out tailpipe 90a. Thermally sensitive snap switch 81 senses the temperature inside first treatment 80 by element in 81a and operates insulated contact 88 which when treatment 80 is below the desired temperature contacts point 87 is contacted by contact 88 and is free of point 89 (as shown in FIG. 3) so that line 100 brings electric power from battery 91 through ignition switch 92 to the ignition system 99 and to insulated contact 88 by a flexible portion 100a. Wire 101 is connected to point 87 to energize solenoid 98 to open gas flow valve 99 to the engine. Valve 85 will be closed until energized to close gasoline flow to the main jet by line 83 and to the idle jet by branch line 83a to close off gasoline flow from the float bowl of carburetor 82 to the air passing through carburetor 82. When engine 7 is below temperature solenoid 98 will be energized as points 88 and 87 are closed, so gas control valve 102 will be open for operating on gas until first treatment 80 is up to the desired temperature. When the desired temperature is reached by treatment 80 as sensed by 81a, insulated element 88 snaps over to the right, as viewed in FIG. 3, to contact point 89 to energize solenoid 84 to open gasoline flow control valve 85 and gasoline will flow to main jet line 83 and idle line 83a through valve 85. Gas flow will be cut off by the cutting of current to solenoid 90 (which closes valve 91 when not energized). The engine 7 will then operate on gasoline as long as exhaust treatment in 80 is above the desired temperature.

This construction allows the use of electric solenoids controlled by very limited action of the temperature sensitive element 81a in the exhaust treatment device 80 to control the operation of the engine to operate on gas below the desired temperature at exhaust treatment 80 and then automatically switch to gasoline operation with a single dualed fueled air and gas mixing device or gasoline fed carburetor 82 and allows two fuels to use a single power controlling throttle 97 for both fuels when supplied separately.

The electric control circuit shown in FIG. 3 could be used to control the shut off valves 79 and 23 of FIG. 1, if suitable solenoids somewhat like 84 and 98 are used to control the motion of rod 27 to shift from gas operation below a desired temperature of treatment 80 to gasoline operation when above said desired temperature of 80 as sensed by element 81a. Solenoids and valves which are closed when energized instead of open when energized could be used by changing the switching if this were desirable.

Other features will be pointed out in the accompanying claims.

I have illustrated my inventions in these various forms; many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. An engine having dual air and fuel mixing devices for feeding said engine, said mixing devices adapted to feed liquid fuel such as gasoline or gas fuel, such as LPG or gas from a pressurized container, means for switching the feeding of the fuel to the engine from one mixing device to the other, an exhaust system, a treatment device in said exhaust system, said treatment device operating better above a desired temperature than below said temperature, a temperature sensing device disposed to sense the temperature of said treatment device, and means operated by said temperature sensing device for controlling the switching means to cause the feeding of said engine with gas fuel when the treatment device is operating below a selected temperature and to automatically cause the feeding of said engine with gasoline when said treatment device is above said temperature said means operated by the temperature sensing device also controlling the switching back to gas fueled operation of said engine when said treatment is below the desired temperature.

2. An apparatus for operating a dual fueled internal combustion engine having an intake manifold and an exhaust system, a treatment device in the exhaust system, a thermally sensitive device disposed to sense the temperature of said treatment device, automatic means responsive to said device for shifting said engine to operate on a gaseous fuel when said treatment device is below a selected temperature as sensed by said device, said device controlling the automatic means to shift said engine to operate on a liquid fuel from operating on said gaseous fuel when said device is above a selected temperature of said treatment device.

3. A device as defined in claim 2, in which the power means to operate said automatic means for shifting from operation of said engine on one fuel to the other fuel, the power for energizing the power means being derived from the suction from said intake manifold of said engine.

4. A device as defined in claim 2, including electrically powered motors for operating the automatic means for shifting from operation of said engine on one fuel to operation on the other fuel, said motors being controlled by said sensing device associated with said treatment device.

* * * * *